(12) United States Patent
Sherwood et al.

(10) Patent No.: US 6,594,942 B1
(45) Date of Patent: Jul. 22, 2003

(54) BATTERY POWERED LIGHTED ROD

(75) Inventors: Robert D. Sherwood, Tulsa, OK (US); Michael A. Lybarger, Broken Arrow, OK (US); Micah Jones, Tulsa, OK (US)

(73) Assignee: W.C. Bradley/Zebco Holdings, Inc., Columbus, GA (US)

( * ) Notice: Subject to any disclaimer, the term of this patent is extended or adjusted under 35 U.S.C. 154(b) by 51 days.

(21) Appl. No.: 09/666,492

(22) Filed: Sep. 18, 2000

(51) Int. Cl.[7] ............................................. A01K 75/02
(52) U.S. Cl. ..................................................... 43/17.5
(58) Field of Search ................................ 43/17.5, 18.1

(56) References Cited

U.S. PATENT DOCUMENTS

| | | | | |
|---|---|---|---|---|
| 4,621,447 A | * | 11/1986 | Rhodes | 43/17.5 |
| 4,766,688 A | * | 8/1988 | Hiles | 43/17 |
| 4,775,920 A | * | 10/1988 | Seibert | 43/17.5 |
| 5,083,247 A | | 1/1992 | Robinson et al. | |
| 5,129,174 A | * | 7/1992 | Wilson | 43/17 |
| 5,172,508 A | * | 12/1992 | Schmidt et al. | 43/18.1 |
| 5,182,873 A | * | 2/1993 | Aragon, Jr. | 43/17.5 |
| 5,347,741 A | | 9/1994 | Konrad | |
| 5,357,410 A | | 10/1994 | Cota et al. | |
| 5,524,831 A | | 6/1996 | Carlson | |
| 5,586,403 A | * | 12/1996 | Ward | 43/17.5 |
| 5,644,864 A | | 7/1997 | Kelly | |
| 5,738,433 A | | 4/1998 | Sparks | |
| 5,826,366 A | | 10/1998 | Matibe | |
| 5,855,084 A | | 1/1999 | Huddleson et al. | |
| 5,982,112 A | | 11/1999 | Pringle et al. | |
| 5,983,553 A | * | 11/1999 | Gordon | 43/17.6 |
| 6,000,808 A | * | 12/1999 | Hansen | 43/17.5 |
| 6,061,946 A | | 5/2000 | Toelken | |
| 6,370,809 B1 | * | 4/2002 | Drew et al. | 43/17 |

OTHER PUBLICATIONS

Sipex, *SP4405 Low Voltage Electroluminescent Lamp Driver with Regulated Output Voltage*, SP4405DS/18, 1998, p. 1–20.

* cited by examiner

*Primary Examiner*—Thomas Price
(74) *Attorney, Agent, or Firm*—Fellers, Snider, Blankenship, Bailey & Tippens, P.C.

(57) ABSTRACT

A battery powered lighted fishing rod comprising: a handle having a forward end; a shaft extending from the forward end of the handle; an electroluminescent lamp secured to the shaft; and a power source for supplying electrical power to the electroluminescent lamp. In one embodiment, the power source includes a battery and a DC-to-AC converter for converting the relatively low battery voltage to a relative high AC voltage suitable for driving the electroluminescent lamp.

9 Claims, 6 Drawing Sheets

BATTERY POWERED LIGHTED ROD

BACKGROUND OF THE INVENTION

1. Field of the Invention

The present invention relates to lighted fishing rods. More particularly, but not by way of limitation, the present invention relates to a lighted fishing rod having at least one electroluminescent lighting device provided thereon.

2. Background of the Invention

Nighttime fishing is a popular activity for a variety of reasons. Unfortunately, the poor lighting associated with nighttime fishing poses a significant number of problems for the fisherman. For example, it may be difficult, if not impossible for a fisherman to visually discern movement of the tip of the rod which would indicate a strike, it may be difficult to find the rod when there is a strike, it may be difficult to detect line entanglement, other people in the area may not be aware that a fishing line is out, etc.

A number of lighted fishing rods have been developed to address these problems and generally aid the nighttime fisherman. Desirable features of prior art devices include: a tip light which provides a ready indication of a strike; a light which illuminates the line guides so the fisherman can observe the fishing line along the pole; a light forward of the reel so that a fisherman can observe the line coming off the reel or have increased light to aid in baiting the line; and a strike sensor so that one or more lights will automatically illuminate when a fish strikes the bait. Generally, these prior art rods house batteries in the rod handle to provide power to the lights as well as a switch for manipulating the lights.

Many of the prior art devices employ a light source housed in the handle in conjunction with a device to transport the light to where it is needed. The light sources employed in these devices, such as incandescent bulbs, tend to have shapes which are not conducive to placement on the rod itself, thus the need to house the light source in the handle and for the transport mechanism. Such devices either illuminate the interior of a transparent or translucent rod, cast a beam along the exterior of the a rod to illuminate the fishing line, or illuminate the rod via a fibre optic strand. These devices favor incandescent bulbs which are relatively inefficient resulting in reduced battery life and which have relatively short bulb life.

U.S. Pat. No. 6,061,946 issued to Toelken discloses a lighted rod wherein an LED is placed in the tip of the rod such that the fisherman can visually detect movement of the tip, in response to a strike, in nighttime use. While the LED may somewhat alleviate concerns of efficiency and bulb life, it does not provide sufficient light to monitor the line through the line guides, it is not conducive to mounting along the rod, and, typically, LED's tend to emit light in a beam like pattern and therefore the brightness of the LED will vary significantly depending on the viewing angle. In addition, the LED of the U.S. Pat. No. 6,061,946 device is not positioned such that it will illuminate any part of the rod other than the tip. Accordingly, the U.S. Pat. No. 6,061,946 apparatus is limited in application to aiding in the detection of movement of the tip of the rod.

It is thus an object of the present invention to provide a lighted fishing rod which employs a suitable light source of relatively high efficiency and relatively long life.

It is further object of the present invention to provide a selectable light source directed at meeting the needs of a nighttime angler in detecting movement of the tip of the rod responsive to a fish strike.

It is yet a further object of the present invention to provide a selectable light source directed at meeting the needs of a nighttime angler in monitoring the state of the fishing line along the length of the rod or in working with the fishing line as in baiting a hook or untangling the line.

It is still a further object of the present invention to incorporate a light source which is conducive to placement along any portion of the fishing rod without adversely affecting either the appearance of the rod or functionality of the rod.

SUMMARY OF THE INVENTION

The present invention provides a battery powered lighted fishing rod which satisfies the needs and alleviates the problems mentioned above. As with other lighted fishing rods, the inventive lighted rod houses batteries within the handle to supply power to the light sources and a handle mounted switch for ready access by the fisherman. However, unlike prior art devices, the inventive system comprises at least one electroluminescent (EL) lighting device which emits light over a surface area rather than at a single point thereby reducing the harshness of the emitted light and improving the viewing angle. The EL lighting device is fabricated from a thin flexible material such that the EL device may be attached to the rod by wrapping the material around the rod at a desirable position and adhesively securing the material to the rod.

In one aspect, the inventive apparatus provides broad, even illumination proximate to the tip of the rod to provide a visual indication of a strike in low light or no light conditions.

In another aspect, the present invention provides broad even illumination proximate the lower portion of the fishing rod to allow monitoring of the line condition along the rod and to provide a work light for activities such as baiting a hook, untangling the line, and the like.

In still another aspect, the present invention provides a battery powered fishing rod which includes an electrical converter to allow the use of illumination devices which require higher voltage than may practically be provided by conventional batteries in a fishing rod, or which require alternating current for proper operation.

In yet another aspect, the present invention provides a strike sensor near the tip to provide illumination of the tip upon the detection of a strike.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

While the preferred embodiment of the inventive device is hereinafter shown and described generically as a "fishing rod", it should be understood that fishing rods are available in a variety of styles (e.g. crappie rods, spinning rods, casting rods, trigger rods, and the like) intended for particular species of fish, for particular sizes of fish, for particular fishing environments, etc., and since all such fishing rods share a number of common elements and have similar appearance, and since the present invention is adaptable to all such applications, the term "fishing rod" is to be interpreted broadly to include any style of fishing rod.

Figures 1, 2, 20:
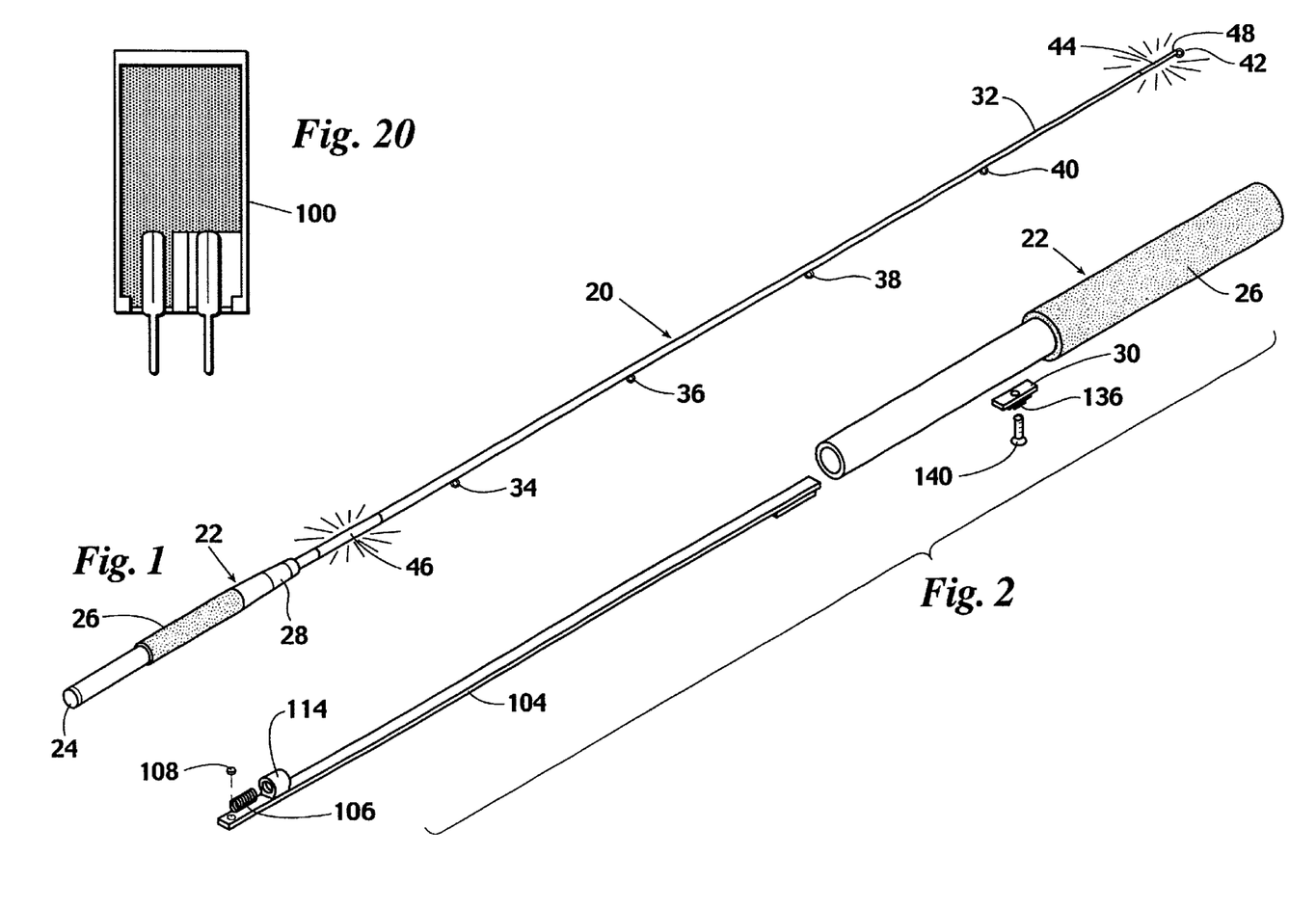
FIG. 1 provides a perspective view of a battery powered fishing rod constructed according to the present invention.
FIG. 2 provides an exploded view of the front portion of a handle as used on a battery powered lighted fishing rod.
FIG. 20 provides a front view of a vibration sensor as incorporated in an embodiment of the inventive battery powered lighted fishing rod.

Referring now to the drawings, wherein like reference numerals indicate the same parts throughout the several views, a preferred embodiment of the inventive battery powered lighted rod 20 is shown in FIG. 1. Preferably, rod 20 comprises: a handle 22 having cap 24, grip 26, reel mount 28, and light switch 30 (FIG. 2); a shaft 32 extending forwardly from the handle having a forward tip 48; line guides 34, 36, 38, 40, and 42, secured to shaft 32 in alignment such that the fishing line will follow a path which is substantially in-line with shaft 32 between line guide 34 and line guide 42; electroluminescent lamp 44 located near the tip 48 of shaft 32; and electroluminescent lamp 46 positioned on shaft 32 forward of reel mount 28.

Terms of direction, i.e. forward, rearward, left, right, etc are used to denote directions or positions in reference to the fishing rod when viewed from the perspective of a fisherman using the inventive device. Since a fishing rod is typically held in front of the fisherman, "forward" or "forwardly" would be used in reference to features located toward the tip 48 of rod 20 while the term "rearward" or "rearwardly" would be used in reference to features located toward the handle 22.

Figure 3:
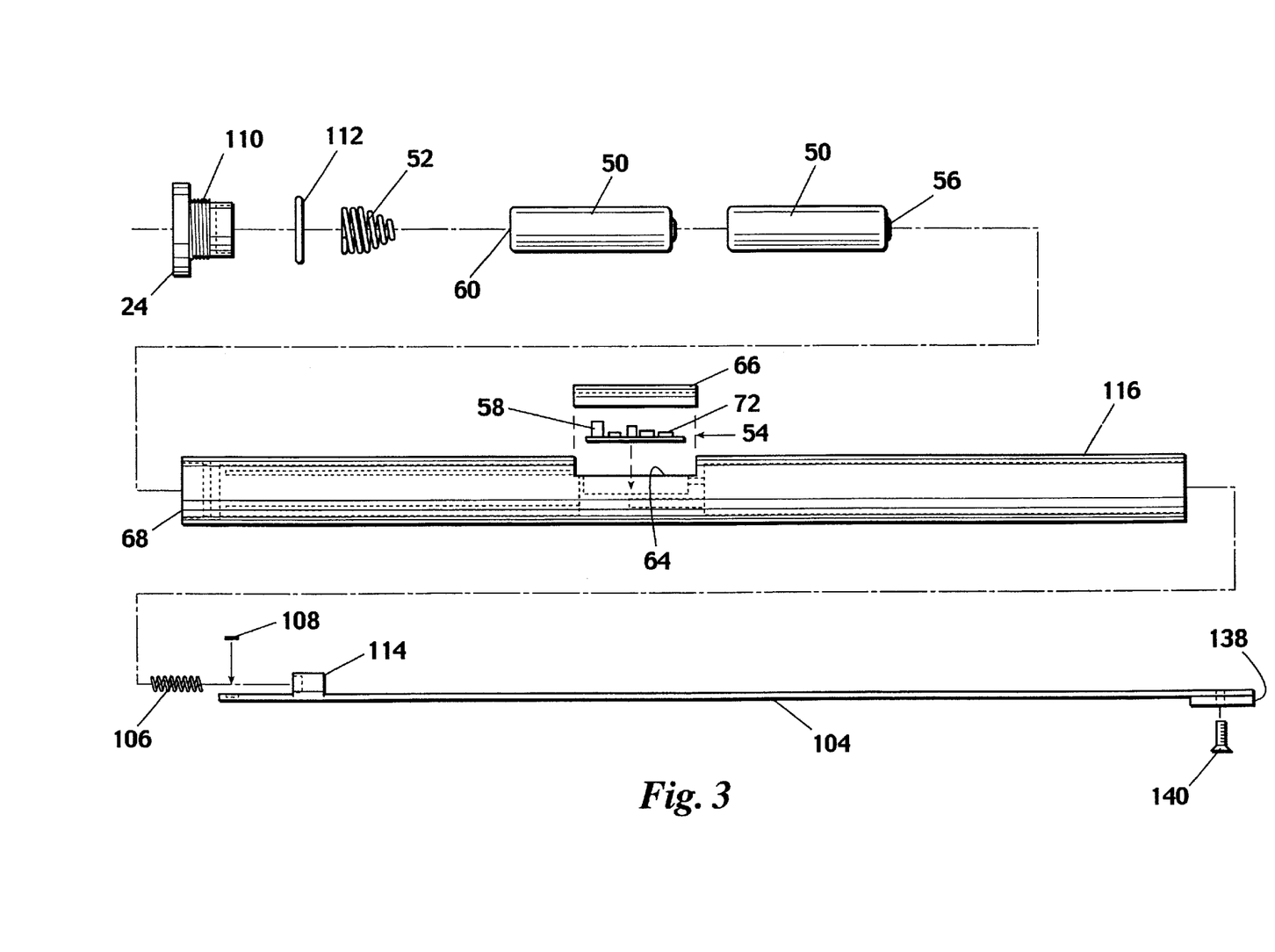
FIG. 3 provides an exploded view of a preferred embodiment of a handle as used on a battery powered lighted fishing rod.
Figures 4, 6, 7, 8, 9:
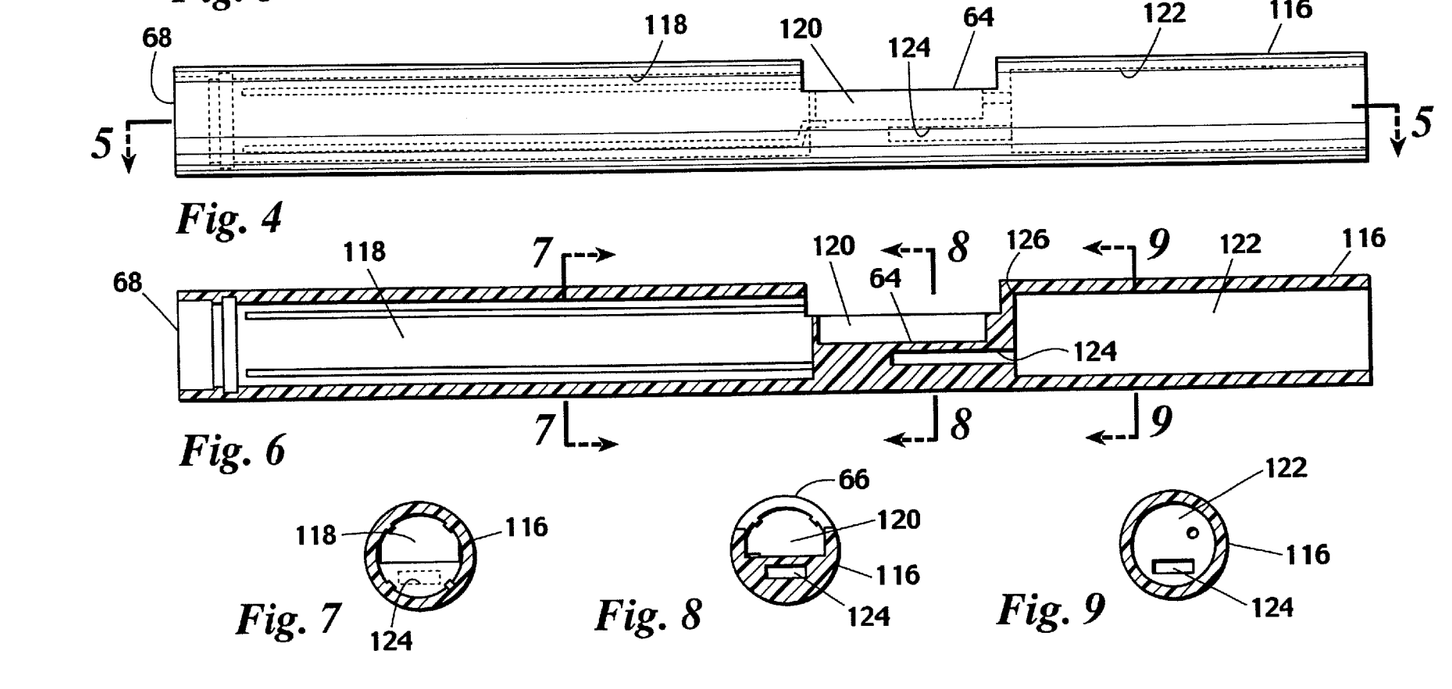
FIG. 4 provides a side view of the handle tube incorporated in the handle as used on the inventive battery fishing rod.
FIG. 6 provides a cutaway side view of the handle tube taken along line 6—6 of FIG. 5.
FIG. 7 provides a cutaway end view of the battery compartment of the handle tube taken along line 7—7 of FIG. 6.
FIG. 8 provides a cutaway end view of the converter housing of the handle tube taken along line 8—8 of FIG. 6.
FIG. 9 provides a cutaway end view of the front portion of the handle tube taken along line 9—9 of FIG. 6.
Figure 5:
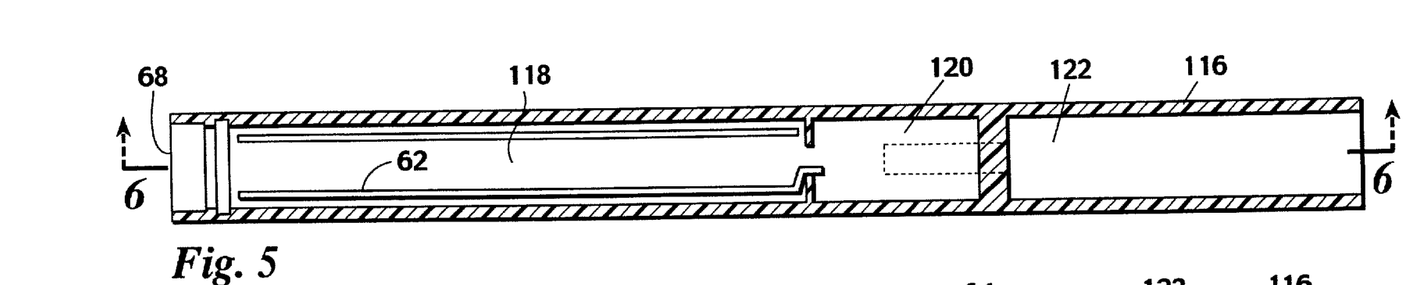
FIG. 5 provides a cutaway top view of the handle tube taken along line 5—5 of FIG. 4.
Figure 10:
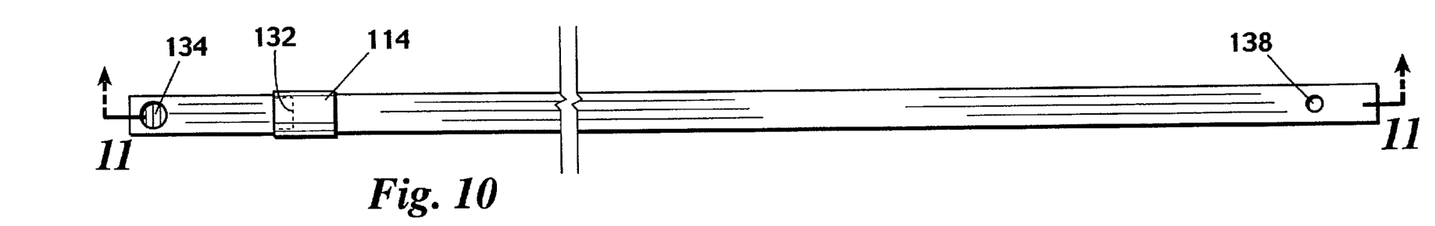
FIG. 10 provides a top view of a magnet arm incorporated in the inventive battery powered lighted fishing rod.
Figures 11, 12, 13, 14, 15, 16:
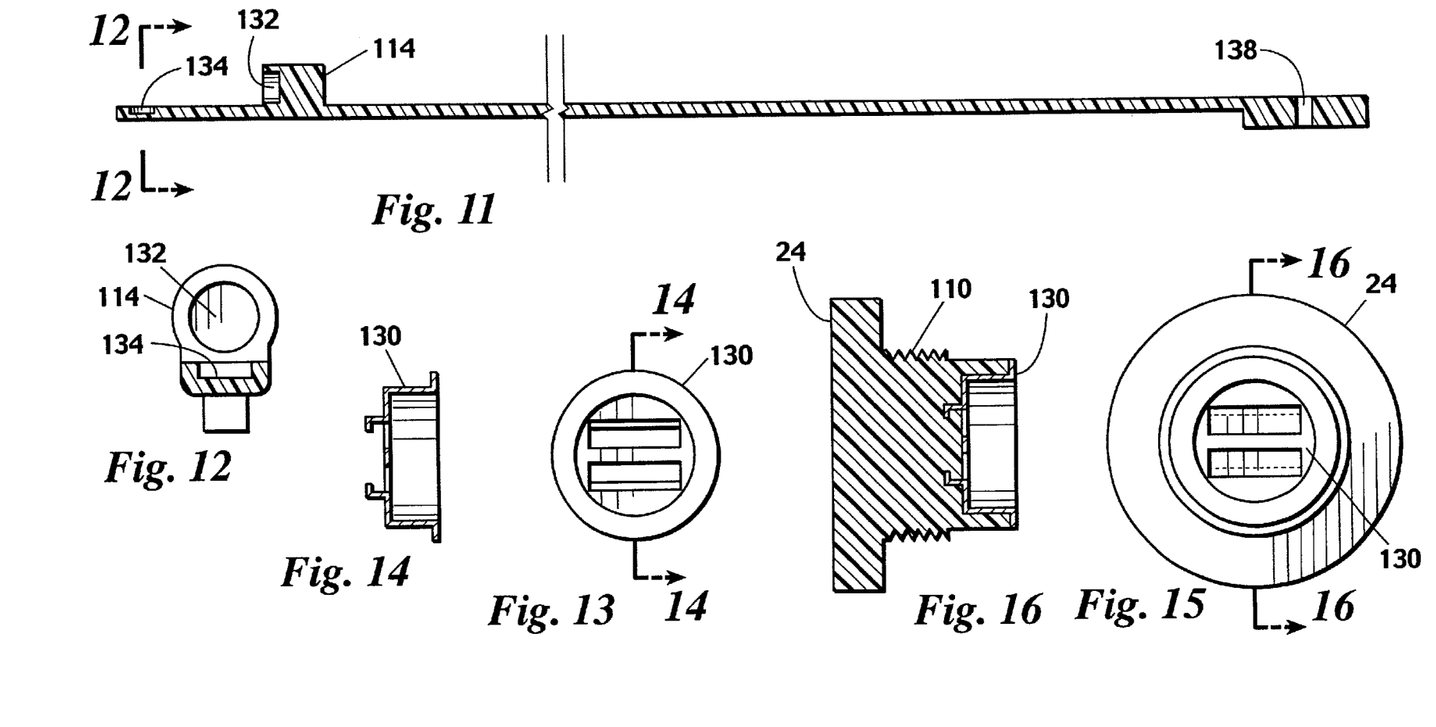
FIG. 11 provides a cutaway side view of the magnet arm taken along line 11—11 of FIG. 10.
FIG. 12 provides a cutaway end view of the magnet arm taken along line 12—12 of FIG. 11.
FIG. 13 provides an end view of a conductive insert as used in the handle cap.
FIG. 14 provides a cutaway side view of the conductive insert taken along line 14—14 of FIG. 13.
FIG. 15 provides an end view of a handle cap incorporated in the inventive battery powered lighted fishing rod.
FIG. 16 provides a cutaway side view of the handle cap taken along line 16—16 of FIG. 15.

Referring next to FIG. 3, batteries 50 are housed in handle tube 116 of handle 22 and maintained in a forward position within handle 22 by spring 52 and cap 24. Preferably, batteries 50 are conventional AA batteries such that the series combination of two batteries 50 will provide approximately three volts DC to power DC-to-AC converter 54.

As best seen FIGS. 4–9, handle tube 116 provides: rearward battery compartment 118 which includes internally threaded opening 68 for threadedly receiving exterior threads 110 of cap 24; converter housing 120, located centrally in tube 122; forward cavity 122 having rear wall 126; and slot 124 extending rearward from rear wall 126.

Batteries 50 are positioned in handle 22 such that the positive terminal 56 of forward battery 50 is in electrical contact with terminal 58 of converter 54. Cap 24 includes conductive insert 130 (as best seen in FIGS. 13–16) to retain spring 52 and to ensure electrical contact between spring 52 and conductor 62 to communicate electrical current from the negative terminal 60 of rearward battery 50 to converter 54. In the preferred embodiment, converter 54 is mounted in handle 22 at aperture 64.

After converter 54 is placed in housing 120, cover 66 is adhesively secured to handle 22 to cover aperture 64 and protect converter 54. Preferably, when cover 66 has been attached and cap 24 is received in opening 68 with O-ring 112, battery compartment 118 and housing 120 will be sealed to prevent the entry of water in either housing should the fishing rod be dropped into water or otherwise exposed to wet conditions.

It will be apparent to those skilled in the art that converter 54 could be secured in handle 22 in a number of ways. For example, converter 54 could be inserted in handle 22 through opening 68 prior to the insertion of batteries 50 to achieve the same results.

As will be further understood by those skilled in the art, electroluminescent devices require a power source which provides alternating current at relatively high voltage (preferably on the order of 150 VAC). Conventional batteries, on the other hand, typically provide direct current at a relatively low voltage (1.5 VDC for each AA battery as employed in the preferred embodiment). Thus it can be seen that a DC-to-AC converter is required to convert the electrical power provided by the batteries to meet the requirements of the electroluminescent lamps. Such converters are well known in the art and also commonly known as power inverters.

Electroluminescent (EL) lamps are well known in the art and are available from a variety of manufacturers. EL lamps differ from filament type lamps or LED's in that an EL device produces light over a surface area while filament type lamps emit a relative bright light along a filament (essentially a point source) and LED's likewise emit light over a relatively small area. Characteristically, EL lamps operate at relatively high efficiency and provide exceptionally long life. Such lamps may be produced by a variety of techniques resulting in devices which are either rigid or flexible and, by proper selection of materials, devices may be produced which emit light in any one or more of a variety of colors. While the present invention could employ either a rigid or flexible EL device of virtually any thickness, most preferably, electroluminescent lamps 44 and 46 are thin flexible devices having a thickness of less than 0.1 inches. One example of such a device is manufactured by Metromark, Inc. of Minnetonka, Minn.

Referring again to FIG. 1, individual lamp 44 is first connected to electrical conductors (not shown) which are routed either through the hollow center of shaft 32 or wrapped around the exterior of shaft 32 for connection to converter 54. Lamp 44 is then wrapped around shaft 32 and adhesively secured in place. Likewise, lamp 46 is connected to conductors (not shown) which are also routed along shaft 32 in the same manner for connection to converter 54. Lamp 46 is likewise adhesively secured about the periphery of shaft 32 at the desired position.

Figure 19:
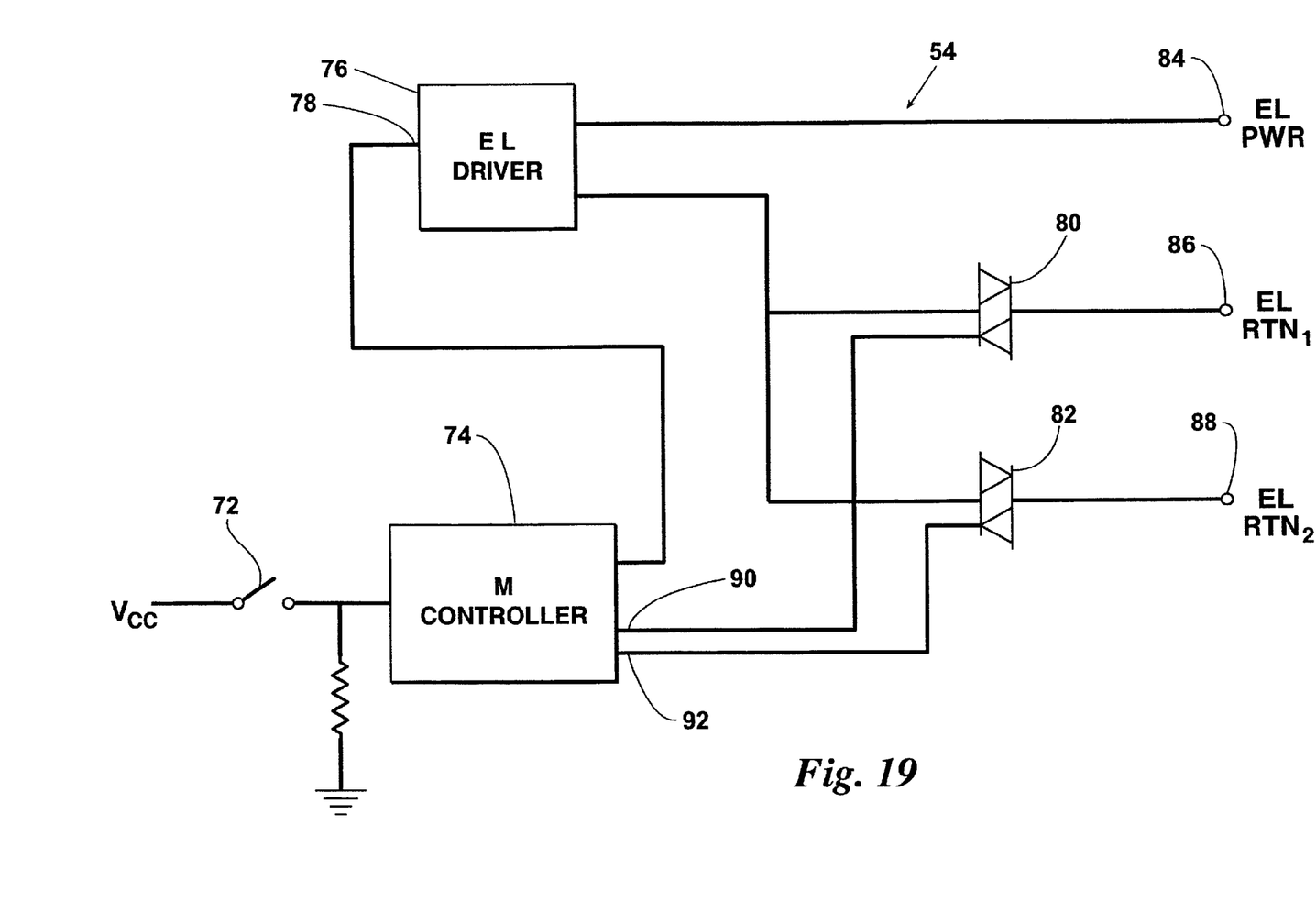
FIG. 19 provides a block diagram of a power inverter incorporated in the inventive battery powered lighted fishing rod.

Referring next to FIG. 19, converter 54 is connected such that the circuit board receives power from batteries 50 whenever batteries 50 are in place. Reed switch 72 is in communication with microcontroller 74 so that microcontroller 74 will sequence EL lights 44 and 46 on and off as reed switch 72 is repeatedly actuated. Preferably, EL lights 44 and 46 are initially in an off state and microcontroller 74 initially places EL driver 76 in a low-power, standby condition via input 78. In this state, converter 54 requires an insignificant amount of power to operate, thus allowing converter 54 to remain connected to batteries 50 without causing unreasonably short battery life. Upon the first actuation of reed switch 72, microcontroller 74 enables EL driver 76 via input 78 such that driver 76 begins producing a voltage suitable for driving an EL lamp. Microcontroller 74 also triggers triac 80 via output 90 such that the high voltage AC produced by driver 76 will appear between output 84 and output 86, thus providing power to EL lamp 46 to illuminate the reel and rearward portion of rod 20. Upon the second actuation of reed switch 72, microcontroller 74 places output 90 in a low state allowing triac 80 to turn-off, and triggers triac 82 via output 92 such that the driver voltage will appear between output 84 and output 88, thus providing power exclusively to EL lamp 44 to illuminate tip 48. Upon the third actuation of reed switch 72, microcontroller 74 triggers both triacs 80 and 82 thus providing the driver voltage across outputs 84 and 86 and likewise, across outputs 84 and 88, thus providing power to both lamps 44 and 46. The above described sequence will then repeat upon subsequent actuations of reed switch 72. If reed switch 72 is engaged for one second or longer, microcontroller 74 disables driver 76 via input 78, sets outputs 90 and 92 low, and enters a sleep state to return converter 54 to its low-power, standby condition.

Referring to FIGS. 1 and 20, in another preferred embodiment, rod 20 further comprises a vibration sensor 100 near tip 48 in electrical communication with microcontroller 74. Vibration sensors are known in the art which, like the EL lamps are then flexible devices. Preferably, vibration sensor 100 is such a device. In this embodiment, the fourth actuation of reed switch 72 causes the microcontroller to disable driver 76 and turn-off triacs 80 and 82. When a fish strikes the fishing line with sufficient force, microcontroller 74 receives a signal from sensor 100 indicating the strike and, in response, enables driver 76 and triggers triac 82 to illuminate lamp 44 to provide an immediate indication to the fisherman that a fish has taken the bait.

Figure 17:
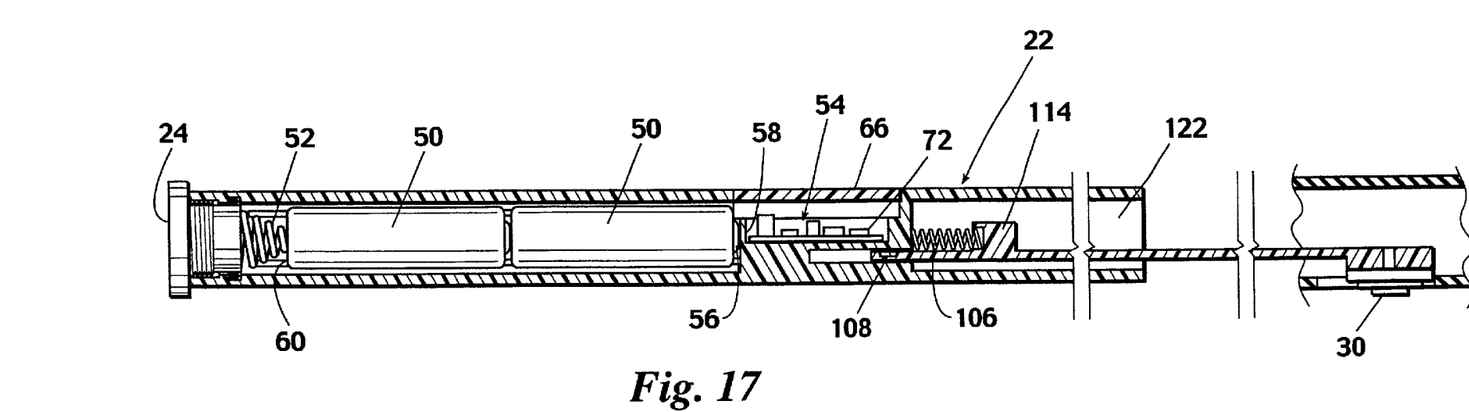
FIG. 17 provides a cutaway side view of the handle showing the switch and magnet arm in the forward, de-actuated position.
Figure 18:
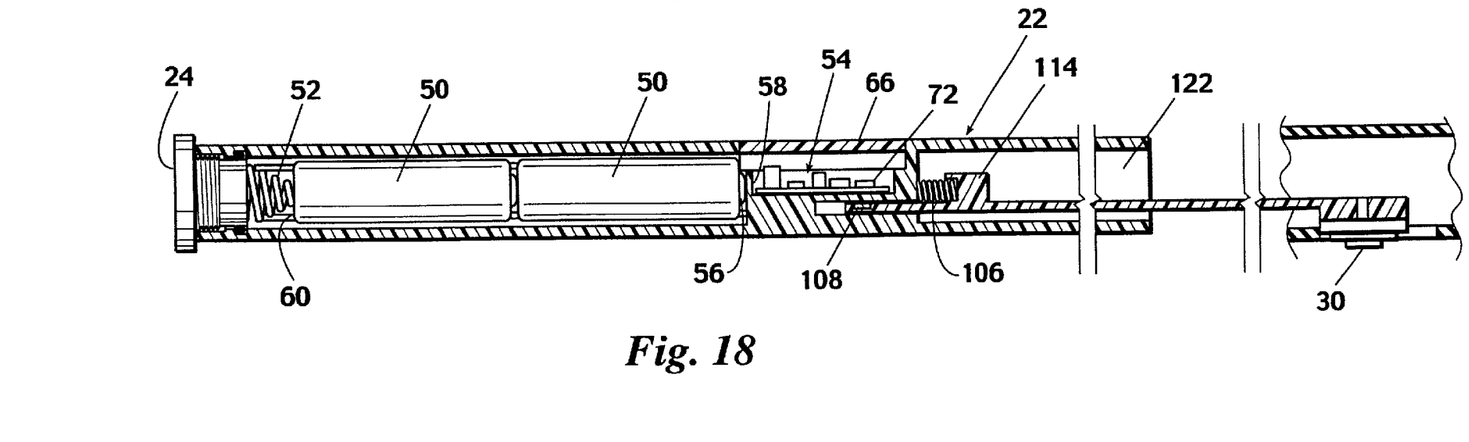
FIG. 18 provides a cutaway side view of the handle showing the switch and magnet arm in the rearward, actuated position.

Referring now to FIGS. 3 and 10–12, to actuate reed switch 72 the user pulls rearward on switch 30 thereby moving magnet arm 104 rearward. Magnet arm 104 includes internally threaded boss 138; spring retainer 114 having a rearward cavity 132 for receiving spring 106; and an aperture 134 for housing magnet 108. Switch 30 include aperture 138 through which screw 140 passes to secure switch 30 to boss 138. When magnet arm 104 is inserted in the forward end of handle tube 116 for sliding movement within handle 22, magnet 134 is located in slot 124 and spring 106 pushes against rear wall 126 to provide a forward biasing force normally holding switch 30 in its fully forward position. As shown in FIG. 18, to actuate reed switch 72 the fisherman pulls rearward on switch 30 sliding magnet arm 104 rearward while compressing spring 106, thus moving magnet 108 in close proximity to reed switch 72. When switch 30 is released, as shown in FIG. 17, magnet arm 104 and magnet 108 move forward as spring 106 expands to move magnet 108 once again away from reed switch 72 thereby de-actuating reed switch 72.

It will be understood by those skilled in the art that while the preferred embodiment of the inventive device has been discussed with reference to electroluminescent lamps, similar results may be obtained with certain types of gas discharge lamps. Such lamps likewise require excitation with a high voltage source, thus requiring a converter to increase the voltage supplied by the battery to a level suitable for operation of the gas discharge device.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A lighted fishing rod comprising:

a handle having a forward end;

a shaft extending from said forward end;

a first electroluminescent lamp secured to said shaft; and a power source for supplying electrical power to said electroluminescent lamp.

2. The lighted fishing rod of claim 1 wherein said power source comprises:

at least one battery; and a DC-to-AC converter in operable communication with said battery, said DC-to-AC converter having an output, said output providing a suitable voltage for said first electroluminescent lamp.

3. The lighted fishing rod of claim 2 wherein said power source is housed in said handle.

4. The lighted fishing rod of claim 1 further comprising a switch located in said handle and in electrical communication with said power source for selectively connecting and disconnecting said first electroluminescent lamp from said power source.

5. The lighted fishing rod of claim 1 further comprising:

a second electroluminescent lamp, wherein said first electroluminescent lamp is positioned on said shaft proximate a tip of said shaft opposite said handle, and said second electroluminescent lamp positioned on said shaft proximate said handle.

6. A lighted rod comprising:

a handle having a forward end;

a shaft extending from said forward end;

at least one lamp for lighting the fishing rod, said lamp requiring a first voltage for operation;

at least one battery providing a second voltage, said second voltage being less than said first voltage; and a power inverter in electrical communication with said battery and having an output, said first voltage being available at said output for operating said lamp.

7. The lighted fishing rod of claim 6 wherein said lamp is an electroluminescent lamp.

8. The lighted fishing rod of claim 6 wherein said power inverter is housed in said handle.

9. A lighted fishing rod comprising:

a handle having a forward end;

an elongated shaft extending from said forward end having a tip opposite said handle;

an electroluminescent light secured to said shaft proximate said tip;

a power source for providing electrical power to said electroluminescent light; and a vibration sensor in communication with said power source, wherein, said power source will automatically supply electrical power to said electroluminescent light in response to a signal from said vibration sensor.

* * * * *